Feb. 3, 1925.
L. G. MILLER ET AL
1,525,408
COTTER PIN
Filed April 18, 1921
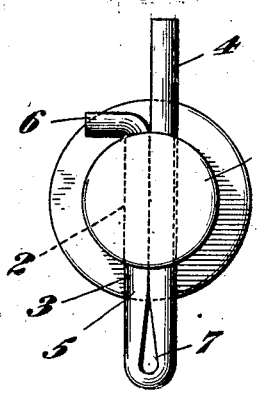
Fig.1.
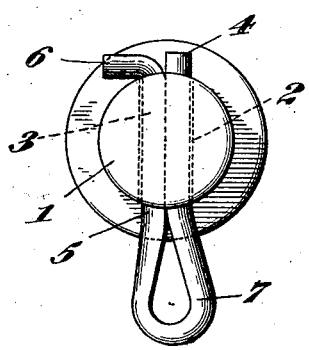
Fig.2.
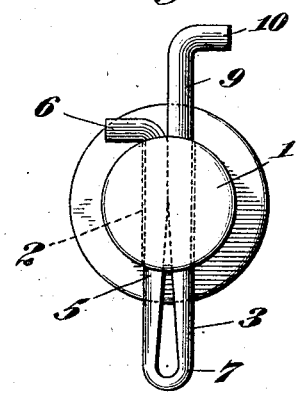
Fig.7.
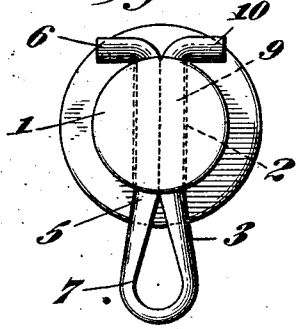
Fig.8.
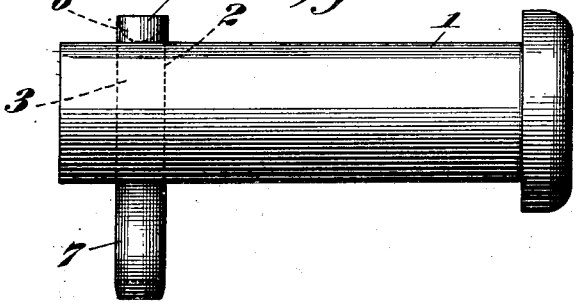
Fig.3.
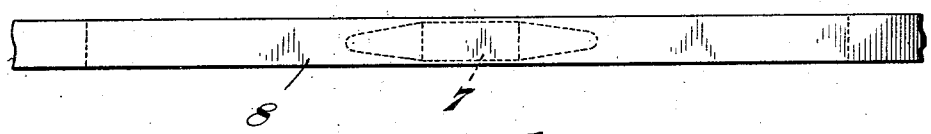
Fig.4.
Fig.5.
Fig.6.
INVENTORS
Louis G. Miller and
Edward C. Long.
BY
Geo. E. Thackray
ATTORNEY Patented Feb. 3, 1925.

1,525,408

UNITED STATES PATENT OFFICE.

LOUIS G. MILLER AND EDWARD C. LONG, OF WESTMONT BOROUGH, PENNSYLVANIA.

COTTER PIN.

Application filed April 18, 1921. Serial No. 462,474.

*To all whom it may concern:*

Be it known that we, LOUIS G. MILLER and EDWARD C. LONG, both citizens of the United States, and residents of the borough of Westmont, county of Cambria, and State of Pennsylvania, have invented certain new and useful Improvements in Cotter Pins; and we do hereby declare the following to be a full, clear, and exact description of the invention, such as will enable others skilled in the art to which it appertains to make and use the same.

Our invention relates to a cotter pin for securing bolts or pins in place in mechanical constructions of all kinds and it may also be used for securing nuts or washers so that the jar or vibration will not loosen them or allow them to be displaced.

Our invention consists generally of a cotter pin which is formed of half round or other cross section of wire or bar bent over upon itself with two sides substantially in contact so that it will fit in a round or other shaped hole and the end of one or both of the legs may have a projection or bent over portion thereon, while one leg may be longer and initially project further outwardly from the bolt or pin, and the loop or bent end of said cotter pin is of reduced section so that it may be easily distorted.

A cotter pin of this type is introduced into a hole in such a way that the projection of one leg rests against the bolt, whereupon the other longer projecting end may be struck with a hammer or other instrument and the other bent or looped end will then open into a loop of wider form by reason of the thinner construction thereof, thus securely locking the pin in place without the necessity of opening it with a screw-driver or chisel, as has heretofore been customary with prior types of cotter pins. This makes a simple construction enabling the pin to be inserted and locked complete in one operation, thus obviating the possibility of a workman putting in a pin without securing it.

I have found by actual manufacture and trial that a cotter pin made of half round metal of uniform cross section throughout and then doubled or bent over with its flat sides adjacent or in contact to form a pin of substantially uniform circular external cross sectional outline, cannot be opened or enlarged at its bent end by holding one of the limbs and striking the other projecting limb with a hammer or otherwise, attempting to move it longitudinally, the reason being, as I believe, that the bending increases the elastic limit of the material at and adjacent the bent portion, to such an extent that the material at and near the bent portion will not open in the form of a loop, even when inserted in a cylindrical hole in metal as customary for such pins, but the free end will by the hammering be distorted, or upset, somewhat like a rivet, but the bent end will not open.

I have found however that by making the half round bar of lesser cross section at and near the portions to be bent, that such a pin can, by hammering one of the free ends, be readily opened at its bent portion to form a loop, that will hold it securely in an opening, and my invention therefore relates to a cotter pin so constructed.

Having thus given a general description of our invention, we will now, in order to make the matter more clear, refer to the annexed sheet of drawings forming part of this specification and in which like characters refer to like parts.

Figure 1 is an end elevation of a bolt with a cotter pin in position ready to be locked; Figure 2 is a view similar to Figure 1 with the cotter locked in position; Figure 3 is a side view of a bolt or pin with the cotter pin in locked position; Figure 4 is a plan view of a rod or bar of rolled metal or wire formed with a thinner intermediate portion, as illustrated, which thin portion may either be cut out or forged or the bar may be rolled in a rolling mill to produce this thin portion at intervals, so that the cotter pins can be sheared therefrom with the heavier portion of the legs at the ends and with the thinner portion intermediate; Figure 5 is a side elevation of the rod or bar illustrated in Figure 4; Figure 6 is an end elevation thereof; Figure 7 is a view of a slightly modified form of cotter pin, the ends of each of the legs of which are bent as illustrated; and Figure 8 is an end elevation showing the same cotter pin when finally positioned.

Referring now to the characters of reference on the drawings:—1 represents the bolt or pin generally, having the opening 2 therein to receive the cotter pin 3. This cotter pin has a longer leg 4, a shorter leg 5, on which latter is a projecting end portion 6. The other looped end of the cotter pin is introduced into place as illustrated in Figure 1, whereupon the longer end is driven down with a hammer or other instrument, which opens the loop end 7, the material of which bends readily by reason of the fact that it is thinner than the other portions of the pin. As illustrated in Figure 4, 8 is a plan view of the rod or bar from which the cotter pins are formed with the thinner portion 7 as shown. Figure 5 is a side elevation thereof and Figure 6 is an end elevation showing a semicircular form of the rod or wire.

Referring now to Figures 7 and 8, this cotter pin is the same as those illustrated in the other figures, with the exception that it is formed with a longer leg 9, which is provided with a bent over offset portion 10.

Although we have described and illustrated our invention in considerable detail, we do not wish to be limited to the exact and specific details thereof, as shown and described, but may use such modifications in, substitutions for, or equivalents thereof, as are embraced within the scope of our invention, or as pointed out in the claims.

Having thus described our invention, what we claim and desire to secure by Letters Patent is:

1. A cotter pin having a looped end with legs of unequal length, one of which is provided with a projection at one end, the loop end being thinner than the other portions of said pin.

2. A cotter pin formed of a metal rod, the ends of which are bent over adjacent to each other, forming a looped end, one of the legs being provided with a projection near its end, the other leg being longer, the cotter pin being thinner at its looped bent portion.

3. A cotter pin composed of a metal bar bent in loop form at its intermediate portion which is of relatively reduced cross section, with two substantially straight leg portions of uniform external cross sectional outline adjacent each other in substantial parallelism, one of the straight leg portions being provided with an end projection and the other straight leg portion having its end extending outwardly beyond the end projection of the other leg.

4. A cotter pin formed of a bar bent at its intermediate portion with the end portions approximately parallel, the portion of the bar at and adjacent to the loop being tapered and thinnest at the bent loop.

5. A cotter pin formed of a rod of semi-circular cross-section bent on itself with its flat sides adjacent, one of the legs having a projection near one end, the other leg being longer, the portions near the bend being thinner than the other portions of said cotter pins.

6. A cotter pin formed from a rod of metal bent over on itself approximately 180 degrees, one of the legs having a projection near its end, the other leg being longer, the portion at the bend being thinner and gradually merging into the other portions of the leg.

7. A bar from which to form a cotter pin, the end portions of said bar being of substantially uniform semi-circular cross section, and the intermediate portion being of reduced cross section.

8. As an article of manufacture, a cotter pin comprising two parallel limbs, joined together at one end, the opposite end of one limb having an enlarged head, and the other limb projecting beyond said head, said pin being of uniform external diameter from said head to and including said joint, the portions of the limbs at and immediately adjacent the joint, being of less cross sectional area than the other portions thereof.

9. As an article of manufacture, a cotter pin comprising a bar bent on itself to provide two parallel limbs, one limb having an enlarged end and the other limb projecting beyond said end, the pin being of uniform external cross sectional outline from and including the joint to the enlarged head, the portions of the limbs at and immediately adjacent the joint, being of less cross sectional area than the other portions thereof.

10. As an article of manufacture, a cotter pin comprising a bar of half round stock bent on itself to provide two parallel limbs having their flat sides facing each other, one limb having a shoulder adjacent its free end and the other limb projecting beyond said shoulder, the portions of the limbs at and near the bend being of less cross section than their other portions.

11. As an article of manufacture, a cotter pin comprising two parallel limbs joined together at one end to form the point or entering end of the pin, the opposite end of one limb provided with a stop shoulder adapted to hold the pin from movement in one direction when inserted in a hole, and the other limb extending beyond said shoulder, said shoulder projecting transversely of the pin away from the other limb, the portions of the limbs at and near the joint being of less cross section than their other portions.

12. As an article of manufacture, a cotter pin comprising two parallel limbs joined together at one of their ends, means on one of said limbs spaced from the joint to hold the pin against movement in one direction after insertion in an aperture, and the limbs at the joint end being of less cross section than their other portions and thus adapted to be bent out of parallel with the portions in the aperture, whereby the pin is held against movement in the opposite direction.

In witness whereof we hereunto affix our signatures.

LOUIS G. MILLER.
EDWARD C. LONG.